United States Patent
Fritsch

(10) Patent No.: US 10,098,316 B1
(45) Date of Patent: Oct. 16, 2018

(54) LIVESTOCK BEDDING GROOMER

(71) Applicant: FRITSCH EQUIPMENT CORPORATION, DePere, WI (US)

(72) Inventor: Ronald M. Fritsch, Greenleaf, WI (US)

(73) Assignee: Fritsch Equipment Corporation, DePere, WI (US)

( * ) Notice: Subject to any disclaimer, the term of this patent is extended or adjusted under 35 U.S.C. 154(b) by 0 days.

(21) Appl. No.: 15/468,954

(22) Filed: Mar. 24, 2017

(51) Int. Cl.
*A01B 33/02* (2006.01)
*A01K 1/015* (2006.01)
*A01K 1/01* (2006.01)
*A01B 33/08* (2006.01)

(52) U.S. Cl.
CPC ........... *A01K 1/015* (2013.01); *A01B 33/02* (2013.01); *A01B 33/082* (2013.01); *A01K 1/0132* (2013.01)

(58) Field of Classification Search
CPC ..... A01B 33/02; A01B 33/021; A01B 33/025; A01B 39/085
USPC ............................ 172/98, 118, 119, 122, 123
See application file for complete search history.

(56) References Cited

U.S. PATENT DOCUMENTS

| | | | | |
|---|---|---|---|---|
| 1,912,706 A | * | 6/1933 | Goodman | A01B 39/166 172/112 |
| 2,665,621 A | * | 1/1954 | Smith | A01B 39/166 172/121 |
| 2,974,616 A | * | 3/1961 | Pawela | A01B 33/021 111/11 |
| 2,975,845 A | * | 3/1961 | Simpson | A01B 33/024 172/108 |
| 2,976,937 A | * | 3/1961 | Maguire | A01B 33/021 172/108 |
| 3,009,520 A | * | 11/1961 | Roland | A01B 33/021 172/47 |
| 3,012,371 A | * | 12/1961 | Pawela | A01B 13/00 172/112 |
| 3,012,615 A | * | 12/1961 | Pawela | A01B 13/00 172/119 |
| 3,028,919 A | * | 4/1962 | Smith | A01B 33/065 172/119 |
| 3,054,461 A | * | 9/1962 | Maguire | A01B 33/021 172/113 |
| 3,086,597 A | * | 4/1963 | McClenny | A01B 33/021 172/119 |
| 3,092,053 A | * | 6/1963 | Kirkpatrick | A01B 33/16 111/101 |

(Continued)

*Primary Examiner* — Matthew D. Troutman
(74) *Attorney, Agent, or Firm* — Nikolai & Mersereau, P.A.; Thomas J. Nikolai

(57) ABSTRACT

The bedding groomer comprises a frame attachable to an ag vehicle such as a skid loader or tractor for movement down the alley of a free stall barn. Pivotally supported on the frame is an elongate shroud that can be moved from a raised travel position to a lowered, laterally extending working position by a hydraulic cylinder. Rotatably mounted within the shroud is an elongated arbor driven by a hydraulic motor. Along the length of the arbor is a plurality of radially projecting tines. As the ag vehicle travels down the alley, the tines dig into the animal bedding material, churning it, to break up hard packed and compressed areas and to aerate deep within the bedding to aid in aerobic composting any organic material, such as manure, that is present in the bedding.

9 Claims, 4 Drawing Sheets

(56) References Cited

U.S. PATENT DOCUMENTS

| | | | | |
|---|---|---|---|---|
| 3,141,341 A | * | 7/1964 | Hutchinson | A01B 39/166 |
| | | | | 172/123 |
| 4,421,177 A | * | 12/1983 | Schlapman | A01B 33/082 |
| | | | | 172/123 |
| 4,708,294 A | * | 11/1987 | Endom | A01B 33/021 |
| | | | | 241/27 |
| 5,143,309 A | * | 9/1992 | Endom | A01B 33/021 |
| | | | | 241/101.763 |
| 5,265,561 A | | 11/1993 | Crawford | |
| 5,957,301 A | | 9/1999 | Wedel et al. | |
| 6,749,804 B2 | | 6/2004 | Schneider et al. | |
| 6,854,528 B2 | * | 2/2005 | Dowdy | A01B 33/065 |
| | | | | 172/817 |
| 6,951,253 B1 | | 10/2005 | Linsmeier | |
| 7,047,905 B1 | * | 5/2006 | Brade | A01K 1/01 |
| | | | | 119/442 |
| 8,393,040 B2 | | 3/2013 | Linsmeier | |
| 9,332,736 B2 | | 5/2016 | Underwood | |

\* cited by examiner

LIVESTOCK BEDDING GROOMER

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to equipment for grooming bedding materials used in free stall dairy barns and, more particularly, to a groomer apparatus attachable to an agricultural vehicle, such as a skid loader or tractor, for tilling and redistributing bedding materials that have become compacted through use by dairy cattle.

II. Discussion of the Prior Art

The Linsmeier U.S. Pat. No. 6,951,253 describes an animal bedding groomer over which the present invention is deemed to be a significant improvement. As is explained in the Linsmeier '253 patent, in larger animal farming operations today, animals are kept in stalls that are generally separated by railings. Dairy cows, in particular, are kept in these types of stalls known as "free stalls". These stalls are arranged in large rows that are separated by alleys. Running the length of the alleys is a relatively short curb of concrete and at the front of the stall is a low wall termed a "brisket board". The space between the curb and the brisket board is filled with a bedding material of various types, including sand, straw, sawdust, lime, clay, paper, rubber chips and mixtures of such materials.

After a cow has resided in a free stall for a period of time, the bedding gets compacted and mixed with urine and manure. The '253 patent referred to above describes a bedding groomer that can be attached to a skid steer loader and that has a boom that extends from the skid steer loader over the animal stall. A rotary arm that sweeps in a generally horizontal plane during use is journaled for the rotation about a vertical axis on the end of the boom and driven by a hydraulic motor. Affixed to the rotary arm are a series of fins or shovels designed to redistribute the bedding material as the rotary arm sweeps in a circular pattern the area between the curb and the brisket board.

As will be explained in detail below, the bed groomer of the present invention is designed to more efficiently till and redistribute bedding materials to thereby turn the manure solids into a sawdust-like material, as well as to break up any hard, tightly compacted areas to restore the bed to a uniform, fluffed-up texture while moving the product from the front of the bed to the back or from the back of the bed to the front to fill in depressions in the bed.

Other prior art machines are known capable of leveling product and moving it from front to back so as to fill in depressions the cows have made and knocking down piles frequently formed between adjacent stalls. However, if the beds become too hard, many of the prior art machines only ride over the tops of the hard spots.

The present invention operates on altogether different principles from known prior art machines. Simply stated, it performs somewhat like a garden "roto-tiller" for penetrating deep and pulverizing hard compacted surfaces.

SUMMARY OF THE INVENTION

In accordance with the present invention, there is provided an apparatus for grooming livestock beds in barns employing free stalls where the apparatus comprises a frame member adapted for attachment to an agricultural vehicle and having an elongated shroud pivotally coupled to the frame for lateral extension from the frame. Contained within the shroud is an elongate arbor that is journaled for rotation and which supports a plurality of radially extending tines along the length dimension of the arbor. A motor is attached to one end of the shroud and has an output shaft coupled in driving relation to the elongate arbor about a linear axis of rotation. The apparatus further includes a hydraulic cylinder that is operatively coupled between the frame and the shroud for selectively changing the angle of elevation of the shroud.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
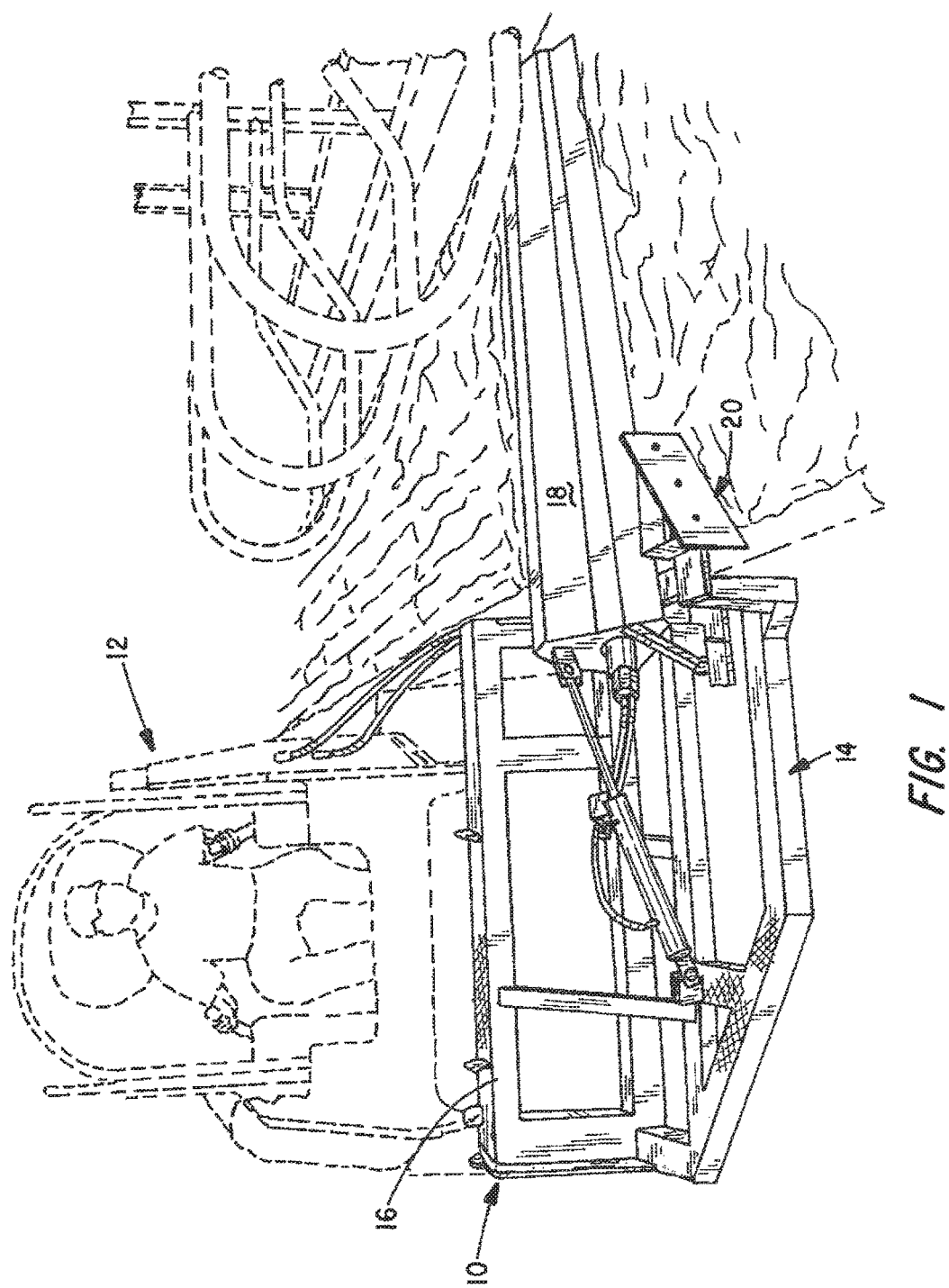
FIG. 1 illustrates the present invention being used to groom bedding in a dairy barn of the free stall type.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, there is shown the apparatus of the present invention indicated generally by numeral 10 affixed to the front of a skid steer loader vehicle 12 and includes a frame 14 joined to the vehicle 12 by a conventional quick-tach hitch arrangement 16. The bedding groomer may also be configured to mount to the side or the rear of the vehicle 12. As the vehicle 12 is driven down the barn's alley, the bed groomer functions to smooth out the bedding material while aerating the bed to aid in aerobic composting of organic material mixed in with the bedding.

Figure 2:
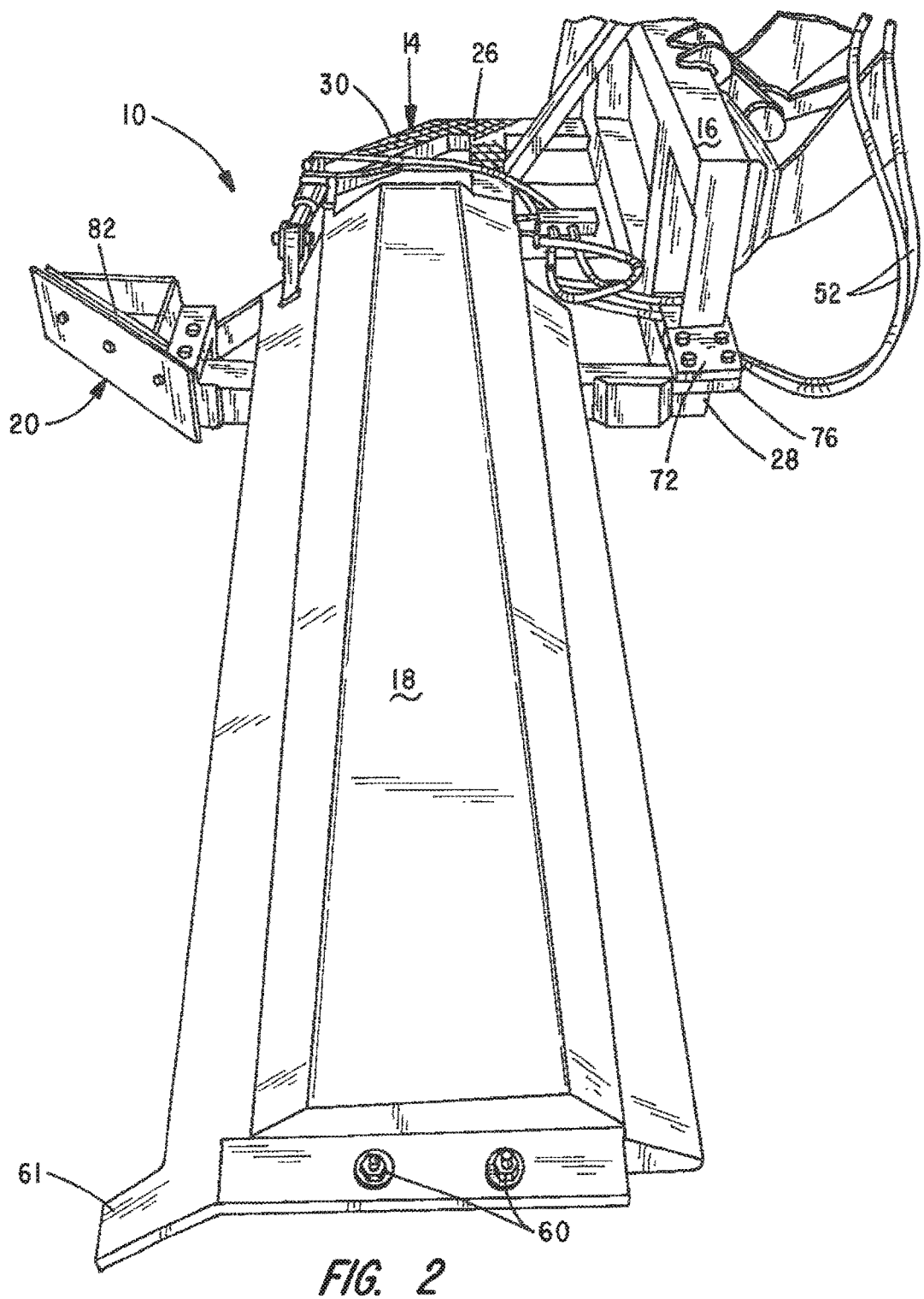
FIG. 2 is a perspective view of the animal bed groomer when seen from the top and showing the shroud in a lowered disposition with respect to the frame.

Turning next to FIG. 2, pivotally attached to the frame 14 is an elongate shroud 18 and shown in its lowered or generally horizontal orientation and projecting laterally with respect to the frame. Also seen attached to the frame is a plow mechanism 20, as seen in FIG. 1, that serves to scrape bedding material from the concrete curb of the bed back into the more central portion of the bed as the vehicle carrying the assembly 10 progresses in the forward direction.

Figure 3:
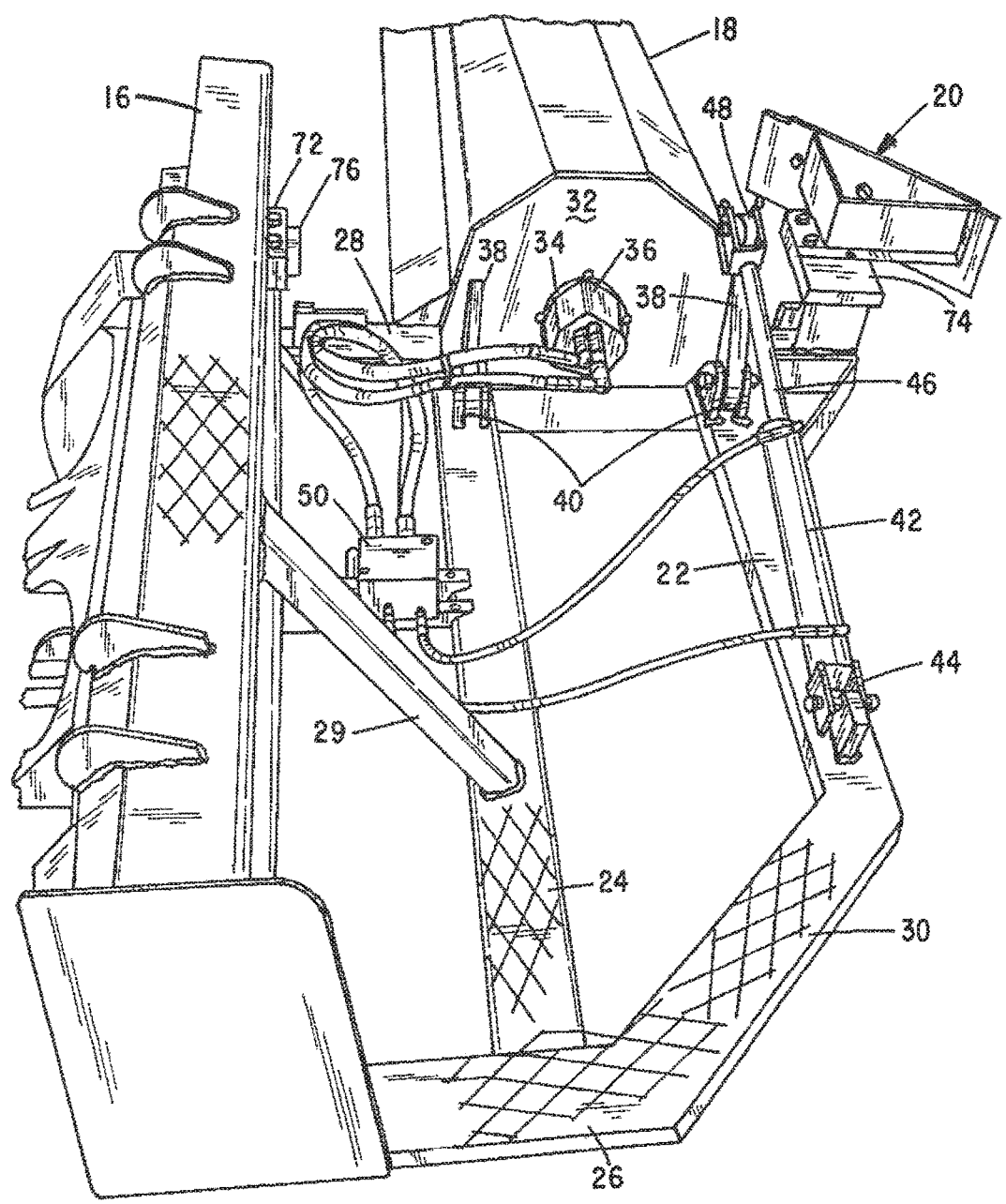
FIG. 3 is a perspective view showing the frame and with the shroud projecting outwardly from one side thereof.

Now, with reference to FIG. 3, the frame 14 is seen to be of a welded steel construction with the quick-tach hitch 16 forming one side of the frame and an elongated front bar 22 forming the opposed side of the frame. Disposed between the quick-tach hitch 16 and the outer frame front bar 22 is an intermediate steel bar 24 welded at one end to a longitudinally projecting steel frame member 26 and to an opposed side member 28 that is also joined by welding to the front bar 22. A steel support brace 29 is welded between the top portion of the quick-tach hitch 16 and the intermediate bar 24. A diagonal frame bar 30 is welded in place between the bars 22 and 26.

As can be further seen in FIG. 3, the shroud 18 has an end plate 32 having an aperture 34 extending therethrough and bolted in place and extending through the aperture is a hydraulic motor 36. The end plate 32 also has rearwardly extending gussets 38 welded thereto and that are pivotally joined to the frame bars 22 and 24 by clevis connections 40. A hydraulic cylinder 42 is connected to the frame member 22 by clevis connection 44 and the piston 46 of the cylinder is likewise connected to the shroud by clevis 48, which is vertically offset from the clevis 44 of the cylinder 42. Thus, when the cylinder 42 is actuated, the shroud 18 can be moved between a generally horizontal working position to an elevated transport position.

Both the hydraulic motor 36 and the cylinder 42 are coupled by hydraulic lines to a valve assembly 50, as seen in FIG. 3. Oil from a hydraulic pump on the vehicle 12 (not shown) is delivered to the valve 50 via hoses 52 in FIG. 2. The valve assembly incorporates a first cartridge for switching oil flow between the motor 36 and the cylinder 42, a second cartridge for controlling motor speed and downward force exerted by the shroud and a third cartridge as a pressure relief for safety should the shroud be lifted when beneath one of the railings.

Figure 4:
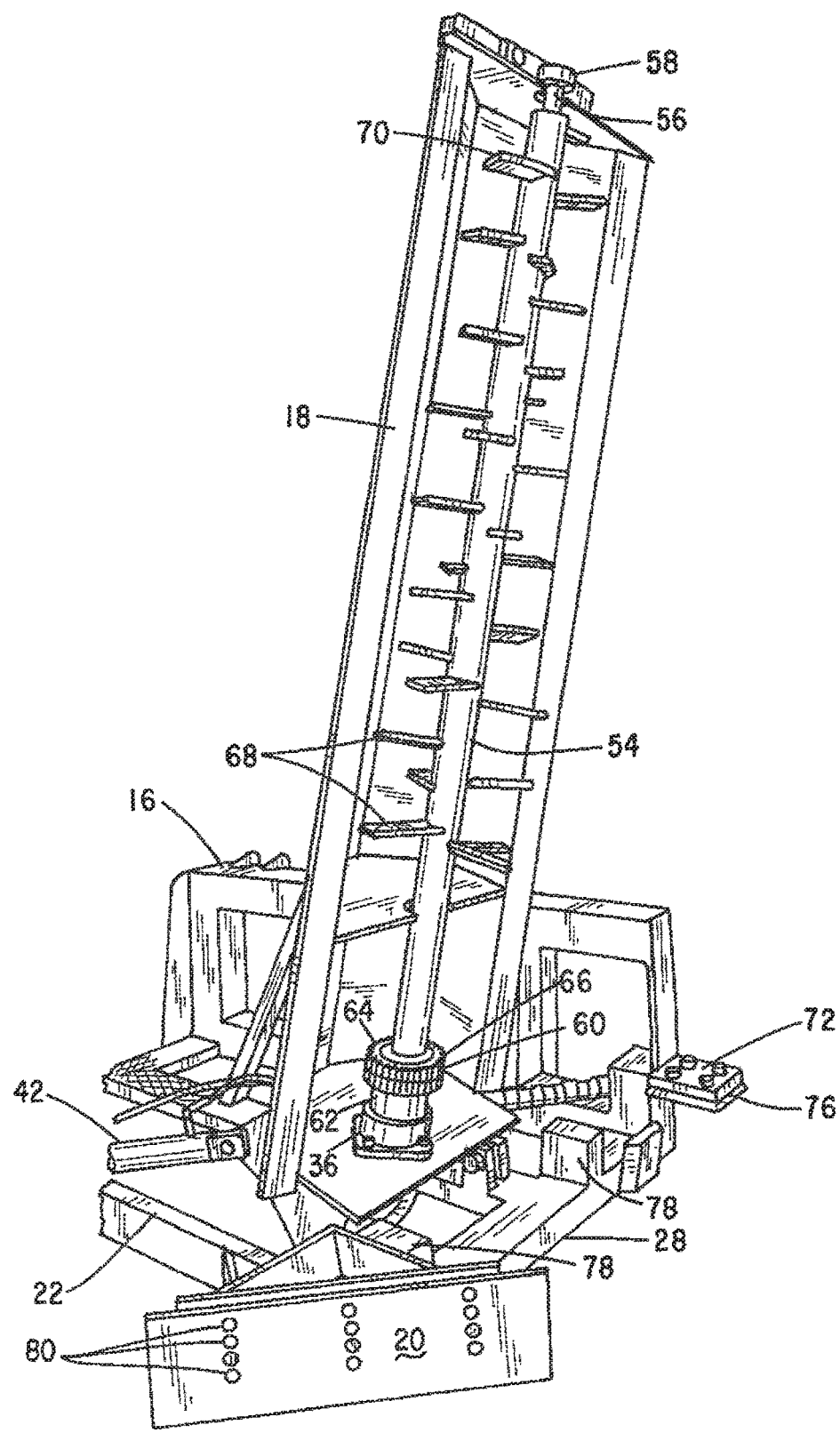
FIG. 4 is a perspective view of the bed groomer with the shroud raised vertically to show the arbor assembly there within.

As seen in FIG. 4, contained beneath the shroud 18 and journaled for rotation therein is an elongate steel arbor 54. Its distal end 56 fits into bearings in a pillow block 58 that is bolted to the shroud by bolts 60, best seen in FIG. 2. The shroud has a shoe member 61 projecting downward from the leading edge of the shroud which serves to clear a path for the bearings supporting the arbor's distal end.

The hydraulic motor 36 has an output shaft supporting a spur gear 62 and, likewise, at the proximal end of the arbor 54 is a second spur gear 64. These two spur gears are engaged by a common connector chain 66. The motor assembly incorporates a pair of tapered roller bearings for support of radial and axial loads imposed by the arbor during operation.

The elongate arbor 54 supports a plurality of radially extending tines along the length dimension thereof where the length of the tines 68 at the more proximal end of the arbor are of a greater length than the tines 70 more proximate to the distal end of the arbor. The tines may have carbide tips or other hard surface material for greater wear resistance than cold rolled steel. Without limitation, the length of the shroud may be about 6' and its height is such that when in its lowered working disposition, as shown in FIG. 1, will be able to pass beneath the rails defining the open bed areas between which a single animal will recline. Thus, as the grooming operation takes place, the railings will not interfere with forward movement of the grooming apparatus.

FIG. 4 also shows a flange 72 that is welded to the quick-tach hitch member 16 and that extends in a lateral direction. A similar flange 74 (FIG. 3) serves as a mount for the plow member 20. Bolted to the undersides of flanges 72 and 74 are replaceable wear shoes 76 designed to ride along the concrete curb to maintain the arbor with its tines at a desired elevation. Also welded to the frame side member 28 and extending upwardly therefrom are stop blocks 78 which limit the extent of movement of the shroud 18 in its lowered position and thereby establish the slope angle of the cow beds so that they taper down from the brisket board to the curb. The stop blocks are dimensioned to provide a maximum depth of penetration of the arbor tines as at 68 and 70 when the shroud is in its lowered disposition. If the operator does not wish to perform tilling at the maximum depth allowed by the stop blocks 78, the operator has the option of adjusting the depth upward by using the hydraulic arms on the skid loader to raise and lower the complete groomer apparatus 10.

As can be seen in FIG. 4, the plow plate 20 is vertically adjustable with respect to the frame by selecting which of the plurality of apertures 80 is to be aligned with threaded bolt holes (not shown) in the plow support bracket 82.

In operation, an operator will drive into the barn with the arbor in its raised disposition, as shown in FIG. 4, to get through the barn's door and then he will maneuver the vehicle to position the assembly 10 in the barn's alley with the wear shoes 76 resting on the curb and then he will operate the valve to power the cylinder 42 and extend the piston 46 thereby pivoting the shroud assembly 18 from its elevated position to its more horizontal working disposition. The operator may then operate the valve to cause hydraulic oil under pressure from the pump to traverse the valve 50 and thereby power the hydraulic motor 36 which drives the arbor 54 carrying the plurality of tines 68, 70 at a speed in the range of from 250 to 450 rpm. Now, by driving the vehicle in a straight line path, the rotating tines dig into the bedding material to loosen and aerate it and to fill in all depressions which are present due to the animal's weight on the bedding material. At the same time, the plow 20 functions to push bedding material back up onto the cow beds.

In that the shroud 18 is tapered, it is thin enough to slide under the free stall railings at the distal end, yet thick enough to house larger length teeth at its proximal end. The shroud is designed to be wide enough, not only to accommodate the tine length, but also to allow bedding material to be tossed around for improved leveling.

The tines on the arbor are shaped and positioned for tilling very hard product, like sand/clay mix or lime-mixed product. The tines are also sequenced or aligned to move the product to the front or back during leveling caused by the engagement of the leading edge of the shroud engaging the bedding material. It not only levels the material, but it tills and aerates to the depth required in order to have efficient composting. A further advantage of my bedding groomer over those of the prior art is that the aerating feature removes moisture from sand beds or compost, providing a safer area for the cows' udders to lay upon. In the past, farmers had to plow out or dig out the beds with a backhoe to remove hard or bacteria-laden product in the back of the beds. With the machine of the present invention, the aeration and drying out of the beds results in improved bacteria control and less instances of mastitis in the herd.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. Apparatus for grooming livestock beds in barns employing free stalls comprising:
   a) a frame member adapted for attachment to a work vehicle having a hydraulic system;
   b) an elongated shroud pivotally coupled to said frame for lateral extension therefrom, the elongate shroud tapering in its height dimension in progressing from a proximal end to a distal end thereof;
   c) an elongate arbor journaled for rotation within said shroud; said elongate arbor supporting a plurality of radially extending tines along a length dimension thereof; and
   d) a motor attached to one end of the shroud and having an output shaft coupled in driving relation to said elongate arbor about a linear axis of rotation.

2. The apparatus of claim 1 wherein the motor is a hydraulic motor.

3. The apparatus of claim 2 and further including a hydraulic cylinder operatively coupled between the frame and the shroud for selectively changing the angle of elevation of the shroud.

4. The apparatus of claim 3 wherein the hydraulic motor and hydraulic cylinder are adapted to be connected by hoses through valving to the hydraulic system carried by the vehicle.

5. The apparatus of claim 1 wherein the frame supports a curb scraper adjacent a proximal end of the shroud.

6. The apparatus of claim 5 wherein the curb scraper is vertically adjustable with respect to the frame.

7. The apparatus of claim 1 wherein the radially extending tines taper in length along the length of the arbor in progressing from a proximal end to a distal end of the arbor.

8. The apparatus of claim 1 and further including at least one stop block on the frame for setting a slope angle for the shroud with respect to horizontal.

9. The apparatus of claim 5 wherein the frame further supports a pair of wear shoes adapted to ride on a curb member of a free stall livestock bed.

* * * * *